May 24, 1960 C. J. FLETCHER 2,937,823
VERTICAL RISING CONVERTIPLANE HAVING TILTING WING
CHANNEL BOUNDARY LAYER CONTROL SYSTEM
Filed June 3, 1954 4 Sheets-Sheet 1
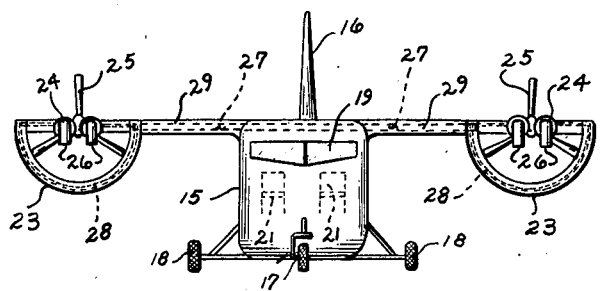
Fig.1
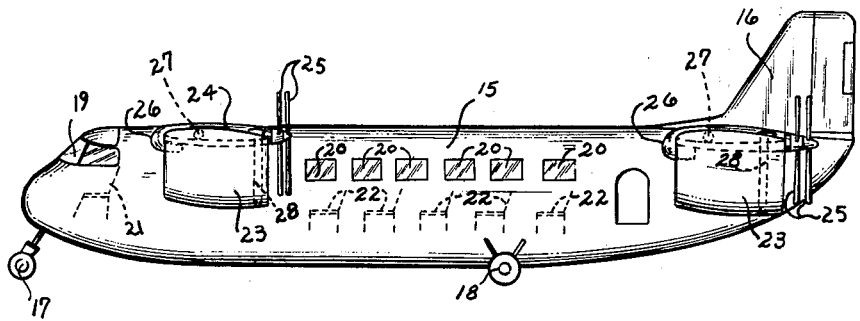
Fig.2
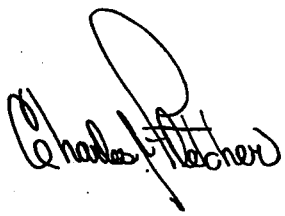
INVENTOR

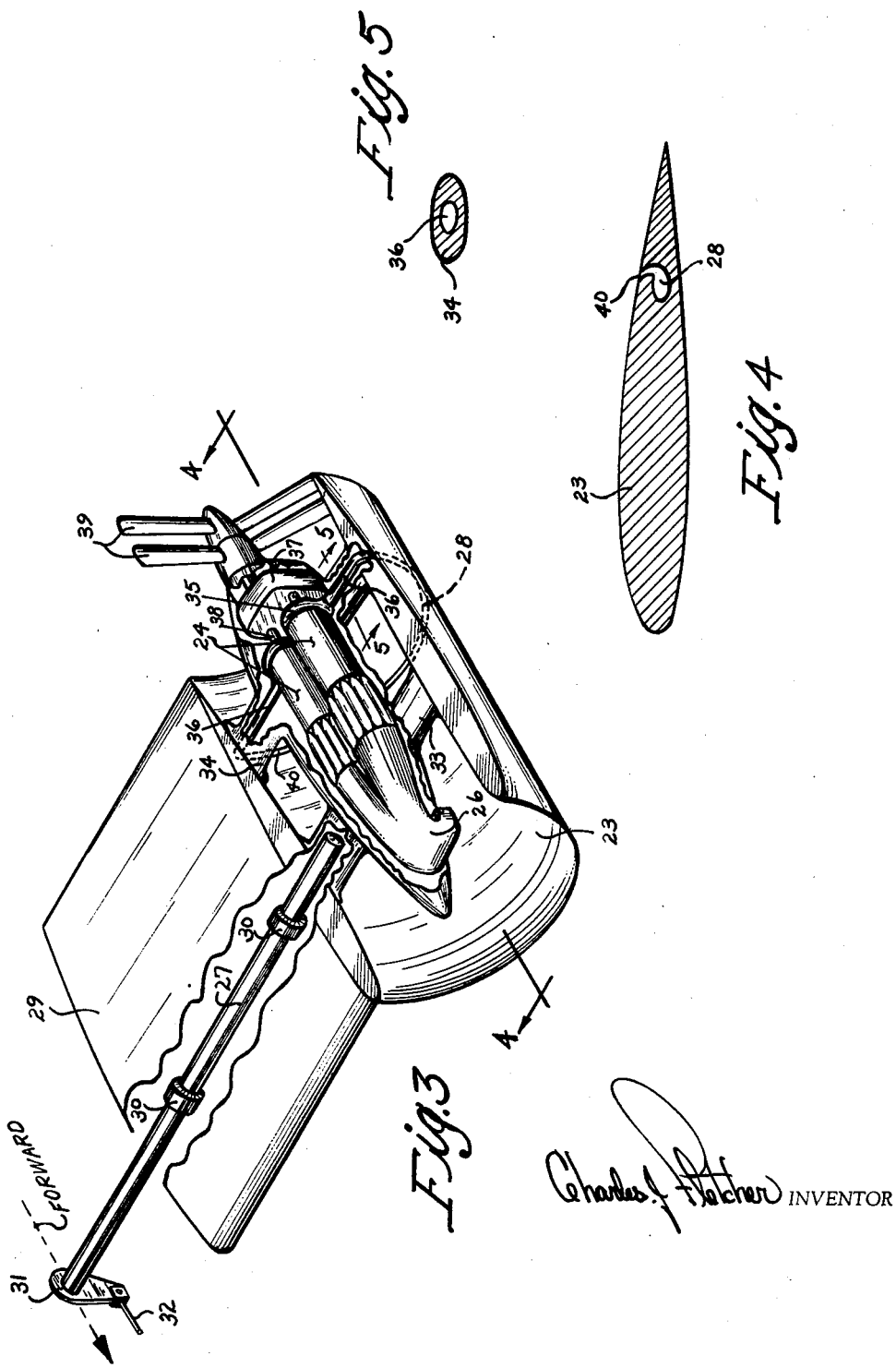

May 24, 1960  C. J. FLETCHER  2,937,823
VERTICAL RISING CONVERTIPLANE HAVING TILTING WING
CHANNEL BOUNDARY LAYER CONTROL SYSTEM
Filed June 3, 1954  4 Sheets-Sheet 3
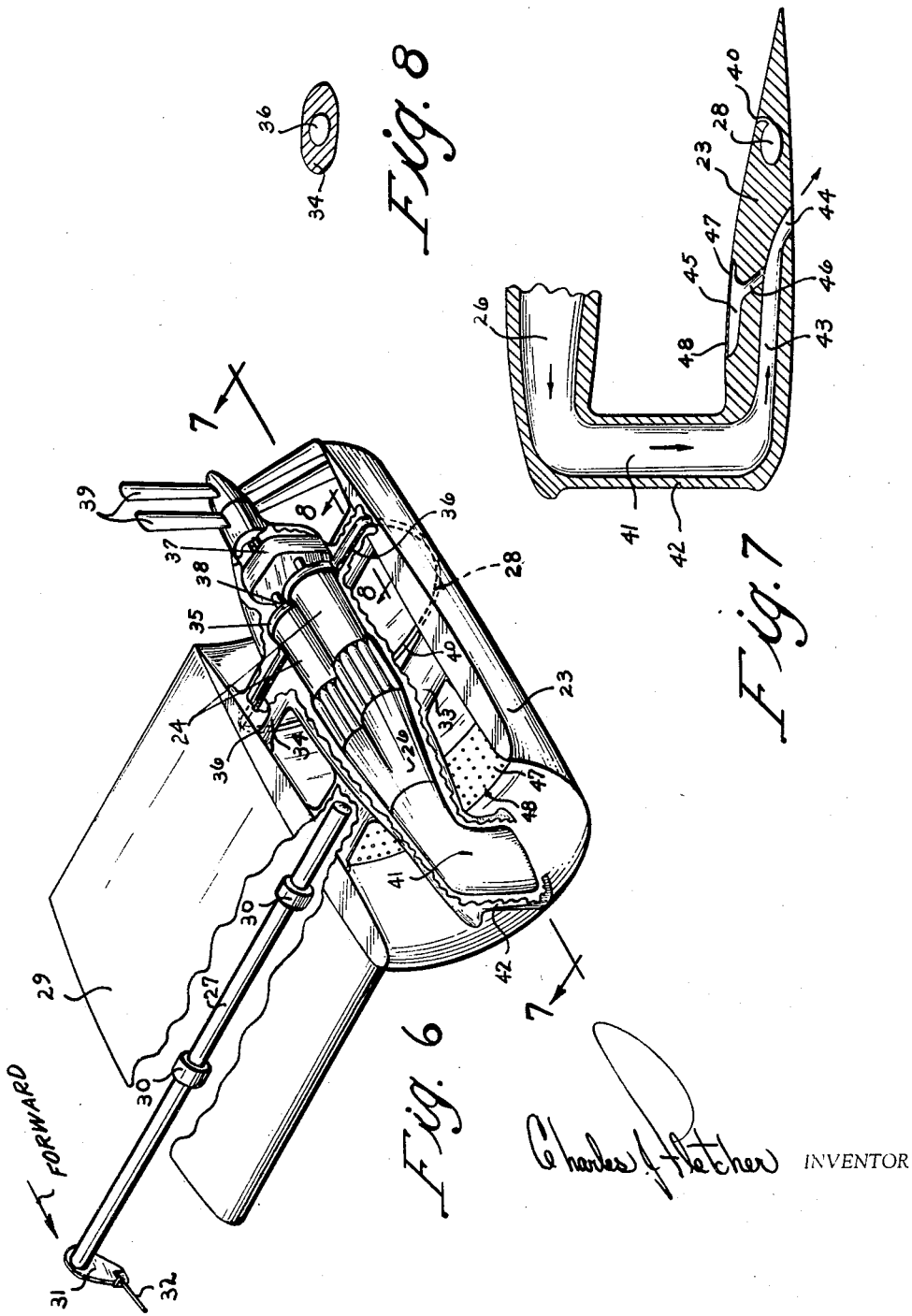
INVENTOR
Charles J. Fletcher May 24, 1960 C. J. FLETCHER 2,937,823
VERTICAL RISING CONVERTIPLANE HAVING TILTING WING
CHANNEL BOUNDARY LAYER CONTROL SYSTEM
Filed June 3, 1954 4 Sheets-Sheet 4
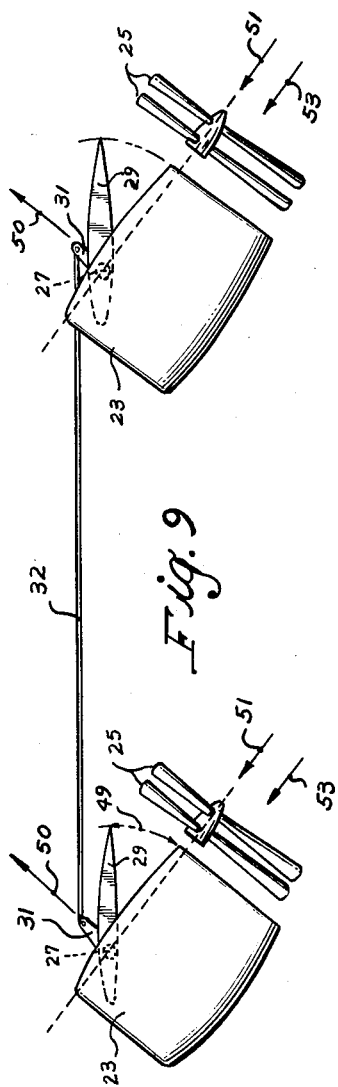
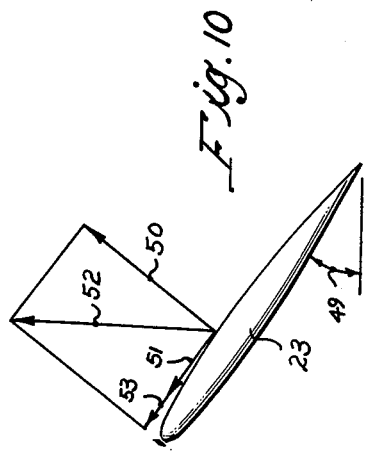
Charles J. Fletcher INVENTOR

United States Patent Office

2,937,823
Patented May 24, 1960

2,937,823

VERTICAL RISING CONVERTIPLANE HAVING TILTING WING CHANNEL BOUNDARY LAYER CONTROL SYSTEM

Charles J. Fletcher, Franklin, N.J., assignor to Fletch-Aire Company, Inc., Sparta, N.J., a corporation of New Jersey Filed June 3, 1954, Ser. No. 434,153

3 Claims. (Cl. 244—12)

This invention relates to improvements in vertical rising aircraft, such as helicopters, combination helicopters and airplanes, convertiplanes, cyclogiros and the like.

Heretofore, various devices have been provided for driving helicopters and convertiplanes by utilizing large rotors wherein complicated mechanical linkages such as drive shafts, transmissions, clutch arrangements, pitch links, swash plates, and the like usually resulted in a relatively complicated apparatus and have proved unsatisfactory from the standpoint of smooth flight characteristics, vibration, ground resonance, low forward speeds, poor stability and the like.

The principal object of the present invention is to provide a convertiplane of new and novel arrangement embodying innerconnecting, moving and stationary parts, wherein channel type wings are pivotally mounted at the outer tip portions of one or more symmetrically disposed conventional wings and whereby each channel is provided with a power source, such as a turbo-prop engine, capable of delivering power in the form of shaft torque and for the purpose of pumping boundary layer air, and driving one or more pusher type propellers, thus providing means for drawing a large volume of air at considerable velocity through the channel wings.

A further principal object in selecting a turbo prop type engine, is to utilize the compressor section of the latter, as a high pressure pump in conjunction with a spanwise boundary layer slot, positioned along the trailing edge portion of each channel wing. Consequently the high pressure pumping action of the engine compressor draws considerable boundary layer air across the channels and into the span-wise channel wing slot, by means of a communicating duct, thus inducing greater lift to each channel wing section.

Another object is to provide an improved convertiplane having channel type wings wherein the main power source is utilized as a high pressure pump in order to draw additional boundary layer air across the channel portion, over and above that quantity derived from the pusher propellers alone.

Another object is to provide an improved channel wing type convertiplane whereby each channel wing and main power source assembly is constructed as an integral unit and can be tilted at various angles of attack, in order to provide more positive control of the generated lift and thrust forces, derived from the channel wing main power source.

Another object is to provide fore and aft symmetrically disposed variable angle of attack channel type wings, whereby uniform lift at a controlled degree is distributed both laterally and longitudinally about the aircraft.

Another object is to provide a simultaneous or differential change in angle of attack of all channel sections at a uniform rate, in order to control the direction of the resulting lift forces derived from each channel wing and to provide control about all principal axes at the discretion of the pilot.

Another object is to provide a channel wing type convertiplane whereby the channel wings act as control surfaces and are permitted to pivot through a minimum change in angle of attack, to achieve the vertical, transitional, and forward conditions of flight.

Another object is to provide channel wing boundary layer control, thereby insuring continuous laminar flow at all positions of channel incidence.

Another object is to provide symmetrically disposed pivotally attached channel wings fore and aft of the aircraft center of gravity, to permit more positive control about the lateral axis throughout the vertical and transitional flight conditions.

Another object is providing control about all three principal axes by regulating the flow of air through each channel by positive control of the boundary layer air and flow derived by the pulling forces generated by the propellers, through coordinated power control of each channel engine, at the discretion of the pilot.

Another object is to provide an improved and simplified means for deriving a maximum quantity of lift from one or more channel type wings, wherein the main power source, such as a turbo prop engine may, at the discretion of the pilot, draw a maximum quantity of air across pivotally attached channels and wherein the power required to perform these functions is of such a reduced degree that these operations are accomplished in an efficient manner.

Still another object is to provide an aircraft having pivotally attached channel type wings positioned at the tips of fixed type conventional wings wherein the frontal drag area is reduced to a minimum, to permit the maximum forward speed.

Still another object is to provide a channel wing type convertiplane whereby the channel wings can be pivoted to provide a positive angle of attack, whereby the lift forces generated by the boundary layer and propellers, produce a resultant lift force upward and rearward with respect to the aircraft vertical axis, to such a degree as to balance the thrust forces generated by both the main power sources and propellers, thus insuring vertical rise of the aircraft, without the usual forward motion.

Still another object as shown in the second embodiment of the channel wing structure is to provide a two stage boundary layer control unit in conjunction with the tilting type channel wing. Consequently, the first stage is provided by the pumping action of the turbo prop engine compressor section, which in turn communicates with, and draws air from, a trailing edge boundary layer channel wing conduit, the second stage being provided by directing the expended exhaust gases from the turbo prop engine, into a chordwise conduit, which leads to a rearwardly facing outlet orifice in the lower surface of the channel wing, near the trailing edge. A spanwise chamber positioned below the upper surface, at approximately the 30 to 45% chordline position and designed to contain a series of closely placed holes (for example 1/64 of an inch in diameter and 1/4 inch apart), within the upper chamber skin, provides a downwardly facing conduit communicating with the rearwardly extending exhaust gas conduit. Consequently the low pressure created by the escaping exhaust gases draws boundary layer air off the upper surface of the spanwise chamber, thus providing a secondary stage of boundary layer effect, causing less upper skin friction and greater total lift.

Other objects, features, and advantages, will appear or be pointed out as the specification proceeds.

It will be understood that changes may be made in the design and that modifications may be made in the arrangement embodying interconnecting moving and stationary parts, without departing from the spirit of the invention.

In the drawings, forming a part hereof, in which like reference characters indicate corresponding parts in all the views:

Figure 1 shows a front view of the convertiplane.

Figure 2 shows a side elevation of the convertiplane.

Figure 3 shows a perspective view of the pivotally attached channel wing assembly, partly broken away.

Figure 4 is a cross section of the channel wing structure, shown on line 4—4 of Figure 3.

Figure 5 is a cross section of the main power source combination rearward support structure and boundary layer air intake conduit, shown on line 5—5 of Figure 3.

Figure 6 shows a perspective view of the channel wing assembly, partly broken away, as described in the second embodiment for a two stage boundary layer system with tilting channel wings.

Figure 7 is a cross section of the channel wing structure, shown on line 7—7 of Figure 6.

Figure 8 is a cross section of the main power source combination rearward support structure and boundary layer air intake conduit shown on line 8—8 of Figure 6.

Figure 9 is a schematic diagram showing channel wing angle of attack for producing vertical flight.

Figure 10 is a vector diagram of the lift and thrust forces shown in Figure 9 to produce vertical flight.

Referring first to Figures 1 through 4, wherein one embodiment shows a single stage boundary layer, tilting channel wing, and wherein similar reference characters designate like parts throughout the several above mentioned views.

The convertiplane shown in Figures 1 and 2 shows fuselage 15 with a conventional vertical stabilizer 16. The aircraft nose wheel 17 and main wheels 18 are shown located fore and aft respectfully. The pilots' windshield 19 is shown located in the conventional manner above the forward portion of the aircraft. The fuselage windows 20 are shown clearly in Figure 2 positioned along the sides of fuselage 15 in the conventional manner. The pilots' seats 21 and passenger seats 22 are represented by dotted lines and clearly shown positioned in a conventional manner in Figure 2.

The channel wings 23 are shown symmetrically and pivotally mounted at the tip portions of fixed wings 29, in a fore and aft manner. The main power source, which in this instant invention, is shown as a twin turbo prop engine 24, mounted above each channel is substantially parallel with respect to the channel wing chord lines. Counter rotating propellers 25 of the pusher type, are driven by the turbo prop engine 24, and are shown positioned just aft of the trailing edge of each channel wing. The turbo prop engine exhaust duct 26 is clearly shown, reversed substantially 180 degrees to provide a reverse flow of engine exhaust gases, through each channel wing, thus adding thrust to the aircraft during transitional and forward flight.

Torque shafts 27 shown in dotted lines, provide means for changing the channel wing angle of attack. Boundary layer duct 28, positioned spanwise along the trailing edge of each channel and shown by dotted lines, communicates with the engine compressor intake portion by a duct (not shown).

The pilot controls (not shown) are rigged directly to the torque shafts 27 by means of a series of conventional cables and bell cranks, also not shown.

Referring now to Figure 3, where the latter shows one of four symmetrically positioned fore and aft wing assemblies wherein the fixed wing section 29 is secured outboard of the aircraft fuselage (not shown).

The channel wing 23 is shown pivotally mounted outboard, at the tip portion of fixed wing 29 by means of a torque shaft 27, positioned span-wise within the fixed wing section 29. Journal bearings 30 provide friction free support to the torque shaft 27, thus allowing the pilot to tilt the channel wing 23 with the least amount of effort. A conventional bell crank 31 and push pull rod 32, which in turn connect the pilot control stick (not shown), by a similar series of actuators, provide positive control of all channel wings simultaneously, at the discretion of the pilot.

Twin turbo prop engine 24, is shown symmetrically mounted above the channel wing 23, and is supported by a forward and rearward horizontal support structure 33 and 34 respectively. An annular intake duct 35 is shown fixedly attached to the compressor intake section of each turbo prop unit. Air ducts 36 are shown positioned within the rearward horizontal support structure 34 and communicate with the ends of spanwise boundary layer duct 28. Consequently, once the turbo prop engine 24 starts functioning, the engine compressors suck the channel wing boundary layer air, into the spanwise boundary layer duct 28, air ducts 36, and annular intake ducts 35, respectively.

Once combustion within the engine is sustained, power is transmitted to the reduction gear box 37 by engine drive shafts 38, and further transferred to the counter-rotating propellers 39, the latter being capable of drawing a considerable volume of air through the channel wing at substantially high velocities. Consequently the high pressure pumping action of the compressor for removal of trailing edge boundary layer air in conjunction with the large mass flow of air through each channel, a high value of resultant lift can be produced.

As the pilot provides the proper channel wing angle of attack, the resultant lift forces acting on the channel, offset the total thrust forces generated by the reverse flow of the engine exhaust gases and propellers, thus producing vertical flight without the usual forward motion.

The turbo prop engine exhaust duct 26 is clearly shown with a U type bend, for utilizing the thrust forces, during forward flight.

Figure 4 clearly shows the spanwise boundary layer duct 28, located near the trailing edge of each channel 23.

A spanwise boundary layer slot 40 is shown communicating with the interior portion of boundary layer duct 28 and provides means for smoothly directing the boundary layer air to the engine compressor annular intakes 35.

Figures 5 and 8 show the boundary layer air duct 36 housed within the central portion of rearward horizontal support structure 34, and communicating between the outer end portion of spanwise air ducts 28, and the compressor annular intake ducts 35, the latter being shown clearly in Figure 3.

Figure 6 shows the second embodiment of this invention, wherein the exhaust gases from the twin turbo prop engine are utilized to the greatest advantage, by producing a second stage, tilting channel boundary layer control within the central portion of the channel wing structure.

The exhaust gases are directed from the twin turbo prop engine 24 into a vertically positioned exhaust duct 41 positioned within support structure 42, which in turn communicates with a chordwise centrally disposed channel wing exhaust duct 43, which leads to rearwardly facing outlet orifice 44, positioned at the under side of the channel wing near the trailing edge. An upper surface, boundary layer chamber 45, positioned spanwise at substantially the 30 to 45% chord line, communicates between the latter and chordwise exhaust gas duct 43 by means of duct 46. The upper surface of boundary layer chamber 45 is provided with a perforated skin 47 having closely spaced holes 48, substantially $\frac{1}{64}$ of an inch in dia. and $\frac{1}{4}$ of an inch apart. Consequently, as the exhaust gases from the main power source are directed through the chordwise exhaust duct 43, located within channel wing 23, the low pressure created within the duct 46 draws in channel wing boundary layer air through holes 48 associated with the upper skin 47 of spanwise chamber 45. Both the boundary layer air and exhaust gases are directed down and aft through the outlet orifice 44 in such a manner so as to add thrust to the aircraft during forward flight.

The trailing edge boundary layer duct and slot, 28 and 40 respectively, communicate with the intake portion of the turbo prop engine, as described in aforementioned embodiment.

The above mentioned embodiment provides for a two stage boundary layer control by providing a complete and continuous cycle of high pressure gases, thus producing a maximum value of lift on each channel.

Figure 9 shows a schematic diagram of the fore and aft channel wings 23 positioned with a positive angle of attack, for accomplishing vertical flight of the aircraft without the usual forward motion. As shown the channels 23 are positioned with a pre-determined angle of attack 49 best suited to produce the required resultant lift components. This is accomplished by the pilot (not shown), by actuating a control stick which in turn actuates a conventional series of bell cranks 31 and push pull rods 32, thus causing shafts 27 shown in dotted lines, to pivot about a spanwise axis within the fixed wing halves 29. Propellers 25 which are of the counter rotating type are pivotally mounted to a twin turbo prop type engine (not shown) which in turn is fixedly mounted chordwise above each channel, thus permitting the unit to swing as an integral part of each channel 23. This design permits the propellers 25 associated with each channel 23 to change its line of thrust substantially upward and forward to provide a lifting force component with respect to the aircraft fuselage, as indicated by arrows 51. It is further obvious that since the propellers 25 pivot as an intergal part of each channel 23, the line of propeller thrust will always remain substantially parallel with respect to the chord lines of each channel. This provides a relative mass flow of air through each channel 23, parallel to any given channel chord thus eliminating separation of the air near the trailing edge which usually results in aerodynamic stall or loss of lift. The first stage boundary layer system as aforementioned further prevents boundary layer separation to occur. With the channel wings 23 positioned with a positive angle of attack, the lift forces generated by the propellers pull a mass flow of air through the channels, and the action of the boundary layer device (not shown) produces an added lift component 50 normal to the channel chords and results in an upward and rearward component with respect to any given channel wing angle of attack. The escaping exhaust gases produce a force component 53, also parallel to the channel wing chords. The combination of the above mentioned forces acting on each channel to produce vertical flight is described as follows. Referring now to Figure 10, wherein is shown the force components acting on each of the channels 23, when the latter are positioned at some pre-determined angle of attack 49, the lift force acting normal to each channel 23 is represented by the upward and rearward vector 50 and is produced by the mass flow of air through each channel which is in turn generated by the aforementioned boundary layer device and counter rotating propellers. Thrust from the counter rotating propellers is represented by the reaction force 51 and is directed upward and forward and always remains parallel to the channel chords. Thrust from the escaping exhaust gases generated from the turbo prop engine is represented by the reaction force 53 and is also substantially parallel to the channel chords. As shown the summation of the above forces result in a vertical lift force 52 which in turn raises the aircraft vertically off the ground. Once a safe altitude is attained, the pilot then decreases the angle of attack of the channels, thus causing the propellers' thrust forces to become more effective and parallel with respect to the aircraft's fuselage reference line in order to accelerate the aircraft horizontally to the higher ranges of forward speed. As forward speed increases, lift is generated by the fixed wing sections to sustain flight and the channels are positioned with a substantially zero angle of attack and are differentially controlled like conventional aircraft ailerons to achieve suitable directional control and stability.

What I claim as new is:

1. An aircraft having a fuselage and a plurality of lifting surfaces, each of said lifting surfaces comprising a portion fixedly attached to the fuselage and a portion pivotally mounted on the fixed portion for angular displacement about a spanwise axis, a power means mounted on the pivoted portion, said power means including a compressor, said pivotally mounted portion being provided with a boundary layer removal slot and duct, means leading from said compressor to said slot for removing said boundary layer air.

2. An aircraft having a fuselage and a plurality of lifting surfaces, each of said lifting surfaces comprising a first portion and a second portion disposed consecutively in spanwise direction, said first portion being fixedly attached to the fuselage of said aircraft, said second portion being pivotally mounted on and adjacent to said first portion for angular displacement about a spanwise axis, a power source comprising a compressor associated with said second portion, said second portion being provided with a boundary layer removal slot, and a conduit leading from said slot to the intake of said compressor whereby the suction action of said compressor removes boundary layer from said second portion and supplies said boundary layer air to said power source.

3. An aircraft having a fuselage and a plurality of lifting surfaces, each of said lifting surfaces comprising a first portion and a second portion disposed consecutively in spanwise direction, said first portion being fixedly attached to the fuselage of said aircraft, said second portion being pivotally mounted on and adjacent to said first portion, said second portion in spanwise section being substantially semi-circular in shape, a power source comprising a compressor associated with said second portion, propellers connected to and driven by said power source, said second portion being provided with a boundary layer removal slot, and a conduit leading from said slot to said compressor whereby the suction action of said compressor removes boundary layer air from said airfoil and supplies said boundary layer air to said power source, said propellers being so arranged to pass a substantial flow of air over said airfoil.

References Cited in the file of this patent

UNITED STATES PATENTS

| | | |
|---|---|---|
| 1,386,713 | Leinweber | Aug. 9, 1921 |
| 1,951,817 | Blount | Mar. 20, 1934 |
| 2,693,920 | Taylor | Nov. 9, 1954 |